United States Patent
Son (10) Patent No.: US 12,360,439 B2
(45) Date of Patent: Jul. 15, 2025

(54) LENS UNIT

(71) Applicant: Panasonic Intellectual Property Management Co., Ltd., Osaka (JP)

(72) Inventor: Matahiro Son, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 144 days.

(21) Appl. No.: 18/184,788

(22) Filed: Mar. 16, 2023

(65) Prior Publication Data

US 2023/0221624 A1    Jul. 13, 2023

Related U.S. Application Data

(63) Continuation of application No. PCT/JP2021/028205, filed on Jul. 29, 2021.

(30) Foreign Application Priority Data

Oct. 28, 2020   (JP) ................... 2020-180872

(51) Int. Cl.
*G03B 17/08*   (2021.01)
*G02B 7/02*   (2021.01)

(52) U.S. Cl.
CPC .............. *G03B 17/08* (2013.01); *G02B 7/02* (2013.01); *G03B 2217/002* (2013.01)

(58) Field of Classification Search
None
See application file for complete search history.

(56) References Cited

U.S. PATENT DOCUMENTS

| | | | |
|---|---|---|---|
| 7,502,156 B2 | 3/2009 | Tonar et al. | |
| 2011/0069198 A1* | 3/2011 | Ezawa | G02B 7/025 |
| | | | 348/222.1 |
| 2020/0049932 A1* | 2/2020 | Wei | G02B 7/022 |
| 2020/0409016 A1* | 12/2020 | Jiang | G02B 7/025 |

FOREIGN PATENT DOCUMENTS

| | | | |
|---|---|---|---|
| JP | 2002303773 A | 10/2002 | |
| JP | 2012123103 A | 6/2012 | |
| JP | 2015045750 A | 3/2015 | |
| JP | 2015068842 A | 4/2015 | |
| JP | 6529224 B2 | 6/2019 | |

OTHER PUBLICATIONS

English translation of International Search Report, mailed Oct. 19, 2021, for International Application No. PCT/JP2021/028205. (2 pages).

* cited by examiner

*Primary Examiner* — Noam Reisner
(74) *Attorney, Agent, or Firm* — Seed IP Law Group LLP (57) ABSTRACT

A lens unit includes a lens, a lens barrel, a housing groove, and a vent hole. The lens barrel houses the lens. The housing groove is formed in the lens barrel and houses an adhesive for bonding the lens and the lens barrel. The vent hole is a hole for discharging air and is formed in the housing groove.

6 Claims, 11 Drawing Sheets

LENS UNIT

CROSS-REFERENCE TO RELATED APPLICATIONS

This application is a continuation of International Application No. PCT/JP2021/028205, filed on Jul. 29, 2021 which claims the benefit of priority of the prior Japanese Patent Application No. 2020-180872, filed on Oct. 28, 2020, the entire contents of which are incorporated herein by reference.

FIELD

The present disclosure relates to a lens unit.

BACKGROUND

Conventionally, when a lens is adhesively bonded to a lens barrel in a lens unit of a waterproof camera, a manufacturing worker applies an adhesive to a groove provided to the lens barrel. The manufacturing worker fits the lens to the lens barrel such that the lens is positioned on the groove to which the adhesive has been applied, thereby adhesively bonding the lens barrel and the lens. A conventional technique is disclosed in U.S. Pat. No. 7,502,156

The present disclosure aims to provide a lens unit that can prevent formation of cavities on an adhesive interface and in an adhesive layer.

SUMMARY

In order to solve the above problem, an aspect of a lens unit includes a lens, a lens barrel, a housing groove, and a vent hole. In the lens barrel, the lens is housed. The housing groove is formed in the lens barrel and in the housing groove, an adhesive for bonding the lens and the lens barrel is housed. The vent hole is formed in the housing groove and a hole for discharging air.

Any combination of the above constituent elements, and any conversion of the expressions in the present disclosure among methods, devices, systems, and the like are also valid as aspects of the present disclosure.

DETAILED DESCRIPTION

Hereafter, identical or equivalent constituent elements, members, and processes illustrated in drawings are marked with the same symbols, and duplicate explanations thereof are omitted as appropriate. The dimensions of the members in each drawing are enlarged or reduced as appropriate for ease of understanding.

First Embodiment

Figure 1:
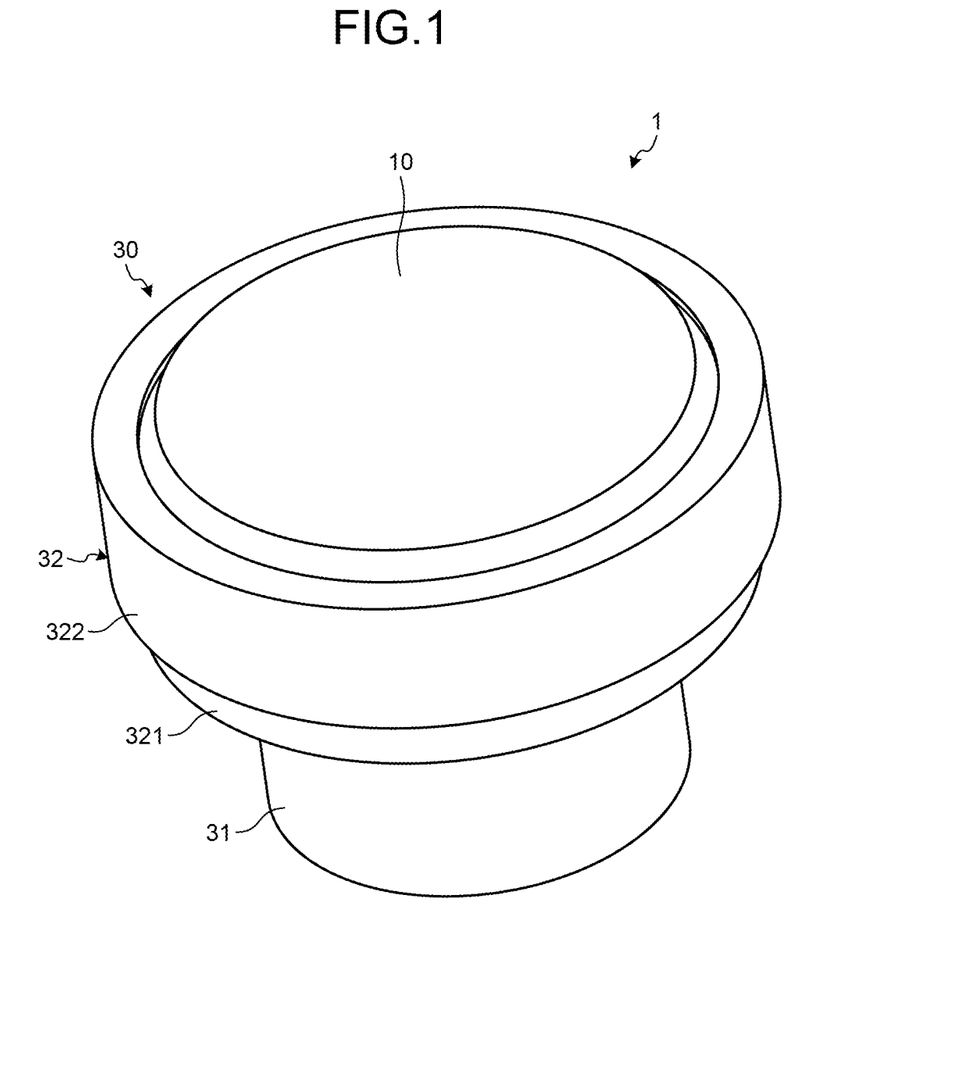
FIG. 1 is a perspective view illustrating an outer appearance of a lens unit 1 according to an aspect of a first embodiment of the present disclosure.
Figure 2:
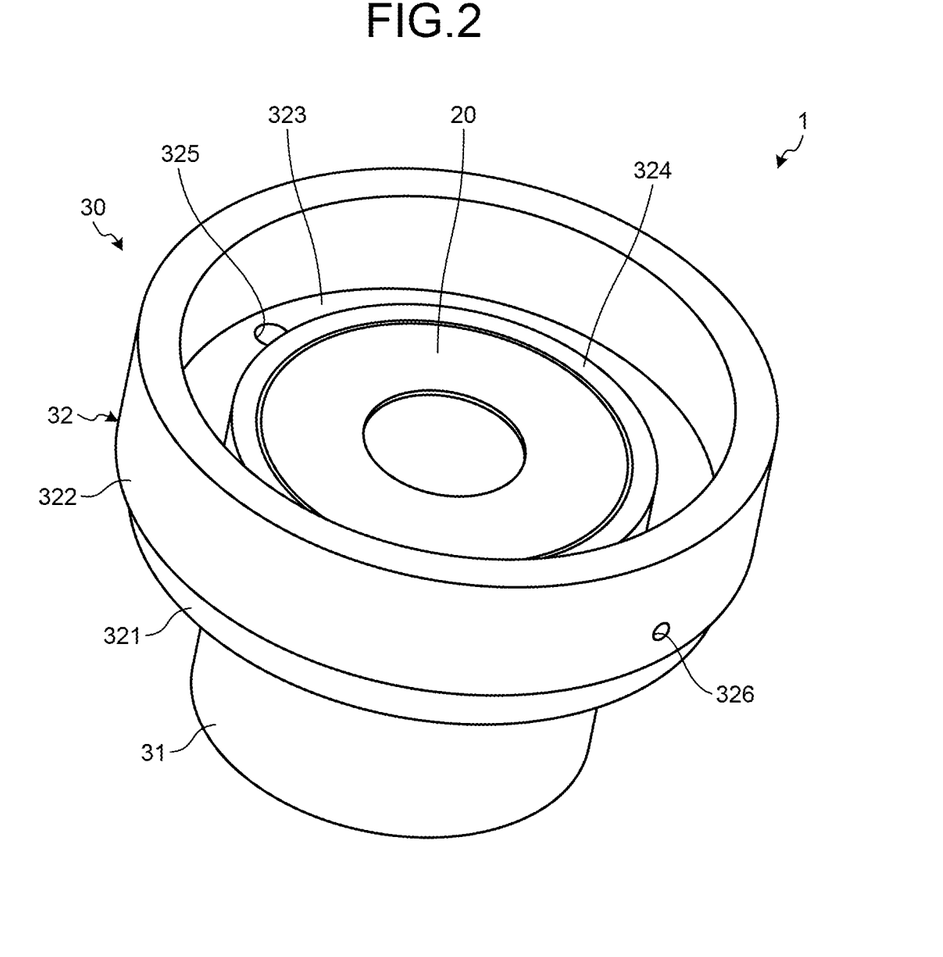
FIG. 2 is a perspective view illustrating an outer appearance of the lens unit 1 according to the aspect of the first embodiment of the present disclosure in a state where a first lens is removed.
Figure 3:
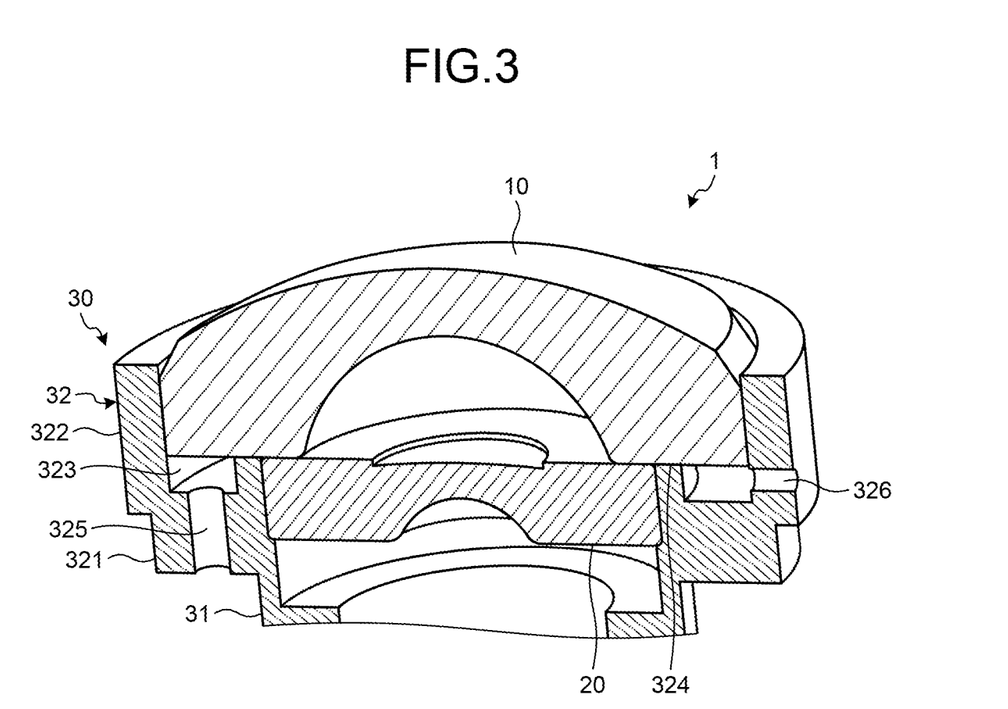
FIG. 3 is a sectional view illustrating a section of the lens unit 1 according to the aspect of the first embodiment of the present disclosure.

FIG. 1 is a perspective view illustrating an outer appearance of a lens unit 1 according to an aspect of a first embodiment of the present disclosure. FIG. 2 is a perspective view illustrating an outer appearance of the lens unit 1 according to the aspect of the first embodiment of the present disclosure in a state where a first lens 10 is removed. FIG. 3 is a sectional view illustrating a section of the lens unit 1 according to the aspect of the first embodiment of the present disclosure.

The lens unit 1 includes a lens barrel 30 in which the first lens 10 and a second lens 20 are mounted. In other words, the lens barrel 30 houses the first lens 10 and the second lens 20. The lens barrel 30 has a body portion 31 and a flange portion 32 having a wider width than the body portion 31. The body portion 31 has a cylindrical shape. The second lens 20 is fitted in an upper distal end portion of the body portion 31 inside the flange portion 32. The body portion 31 illustrated in FIGS. 1 and 2 has a cylindrical shape. In other words, the body portion 31 has a circular cross-sectional shape. The cross-sectional shape of the body portion 31, however, is not limited to circle, and may be oval, triangle, square, or any other shape.

The flange portion 32 is a portion that is included in the lens barrel 30 and to which the first lens 10 is bonded. The flange portion 32 is provided at the upper end of the body portion 31. The flange portion 32 has a bottom portion 321 and a wall portion 322.

The bottom portion 321 is the bottom of flange portion 32. The wall portion 322 is a wall surrounding the bottom portion 321. The inner diameter of the wall portion 322 is substantially the same as the first lens 10 in size. This allows the first lens 10 to be fitted in the flange portion 32.

The bottom portion 321 has a housing groove 323, which is a groove in which an adhesive 3 is housed. The housing groove 323 is the groove that is formed in the lens barrel 30 and in which the adhesive 3 for bonding the first lens 10 and the lens barrel 30 is housed. More specifically, the housing groove 323 is the groove that is provided on a side of an abutting portion 324 on which the bottom surface of the first lens 10 is abutted in the flange portion 32, has an annular shape substantially the same as the outer edge of the first lens 10 in size, and the opening of which is closed by the first lens 10.

The abutting portion 324 illustrated in FIGS. 2 and 3 has a flat surface. This causes the opening of the housing groove 323 to be closed by the first lens 10 when the first lens 10 is abutted on the flange portion 32. As illustrated in FIG. 3, the housing groove 323 is closed by the first lens 10. The surface of the abutting portion 324 is not limited to having a planar shape, but may have a protruding shape with a pointed distal end or any other shape.

The flange portion 32 has an injection hole 325 and a vent hole 326. The injection hole 325 is a hole for injecting the adhesive 3 and formed in the housing groove 323. In other words, the injection hole 325 is the hole to inject the adhesive 3 for adhesively bonding of the first lens 10, into the housing groove 323. The injection hole 325 is formed at the bottom surface of the housing groove 323. More specifically, the injection hole 325 is the hole that passes from the outside of the flange portion 32 to the housing groove 323 through the bottom portion 321 of the flange portion 32. The injection hole 325 is not limited to being formed at the bottom surface of the housing groove 323, but may be formed at the side surface of the housing groove 323. The injection hole 325 illustrated in FIG. 3 is formed substantially in parallel with an optical axis direction of the lens unit 1. The injection hole 325 is not limited to being formed substantially in parallel with the optical axis direction, but may be formed at any angle with respect to the optical axis direction.

The vent hole 326 is a hole for discharging air and is formed in the housing groove 323. The vent hole 326 discharges air from the housing groove 323 when the housing groove 323 is filled with the adhesive 3 for adhesively bonding of the first lens 10. The vent hole 326 is formed at the side surface of the housing groove 323. More specifically, the vent hole 326 is the hole that passes from the outside of the flange portion 32 to the housing groove 323 through the wall portion 322 of the flange portion 32. The vent hole 326 is provided on the housing groove 323 opposite the injection hole 325 across the center of the housing groove 323. The vent hole 326 need not be a hole that penetrates the flange portion 32 to the outside of the flange portion 32, as long as space is provided for escaping air in the housing groove 323. The vent hole 326 illustrated in FIG. 3 is formed substantially orthogonal to the optical axis direction of the lens unit 1. The vent hole 326 is not limited to being formed substantially orthogonal to the optical axis direction, but may be formed at any angle with respect to the optical axis direction.

For example, the injection hole 325 and the vent hole 326 have a diameter equal to or larger than 0.02 mm. In other words, the injection hole 325 and the vent hole 326 have a sectional area equal to or larger than 0.0003 square millimeters. The size of the injection hole 325 and the vent hole 326 is an example and may be changed arbitrarily according to various conditions such as a viscosity of the adhesive 3.

The injection hole 325 and the vent hole 326 that are illustrated in FIGS. 2 and 3 have a circular cross-sectional shape. The cross-sectional shape of the injection hole 325 and the vent hole 326, however, is not limited to circle, and may be oval, triangle, polygon, or any other shape.

The flange portion 32 illustrated in FIGS. 2 and 3 has the injection hole 325 and the vent hole 326 that are provided one each. The injection hole 325 and the vent hole 326 are, however, not limited to being provided one each, but may be provided in multiple numbers. Furthermore, the number of injection holes 325 and the number of vent holes 326 need not be the same.

The method of forming the injection hole 325 and the vent hole 326 is not limited to the specific method. For example, the injection hole 325 and the vent hole 326 may be formed by resin insert molding, by secondary processing, or by other methods.

The following describes a method of injecting the adhesive 3 into the housing groove 323.

Figure 4:
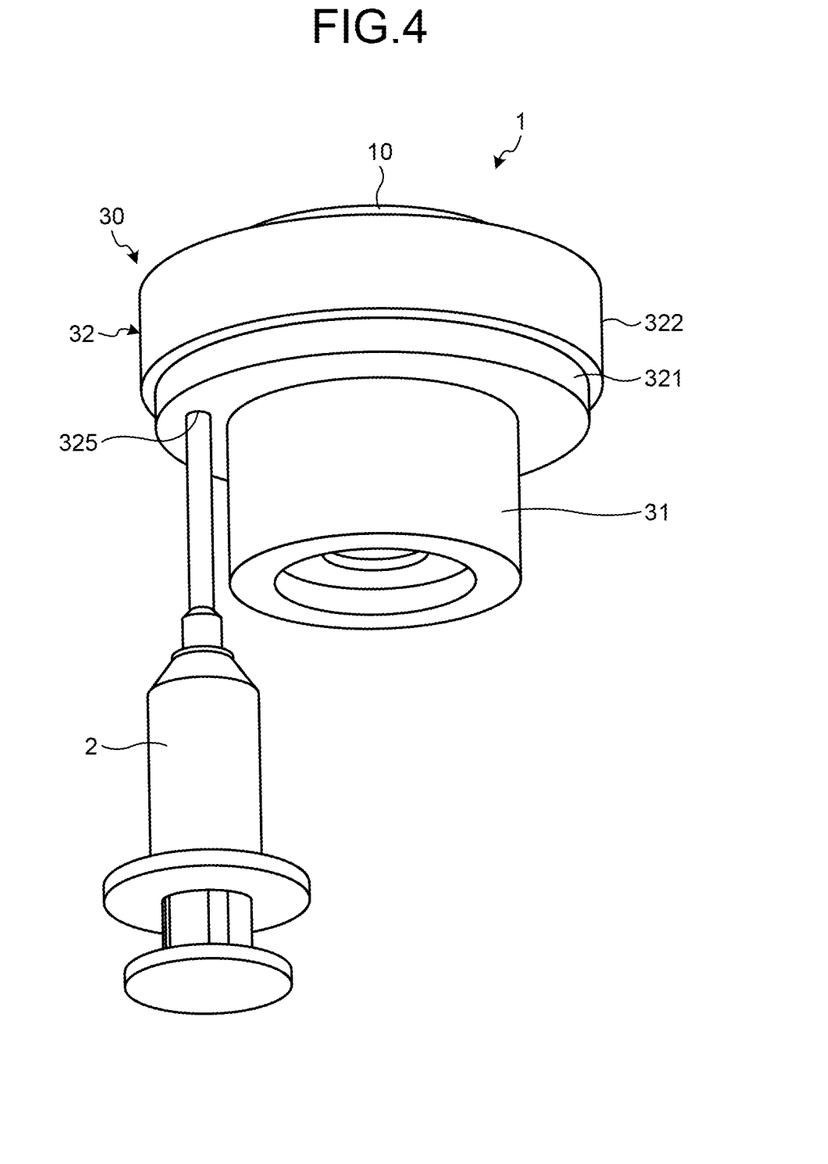
FIG. 4 is a diagram illustrating a method of injecting an adhesive into the lens unit 1 according to the aspect of the first embodiment of the present disclosure.
Figure 5:
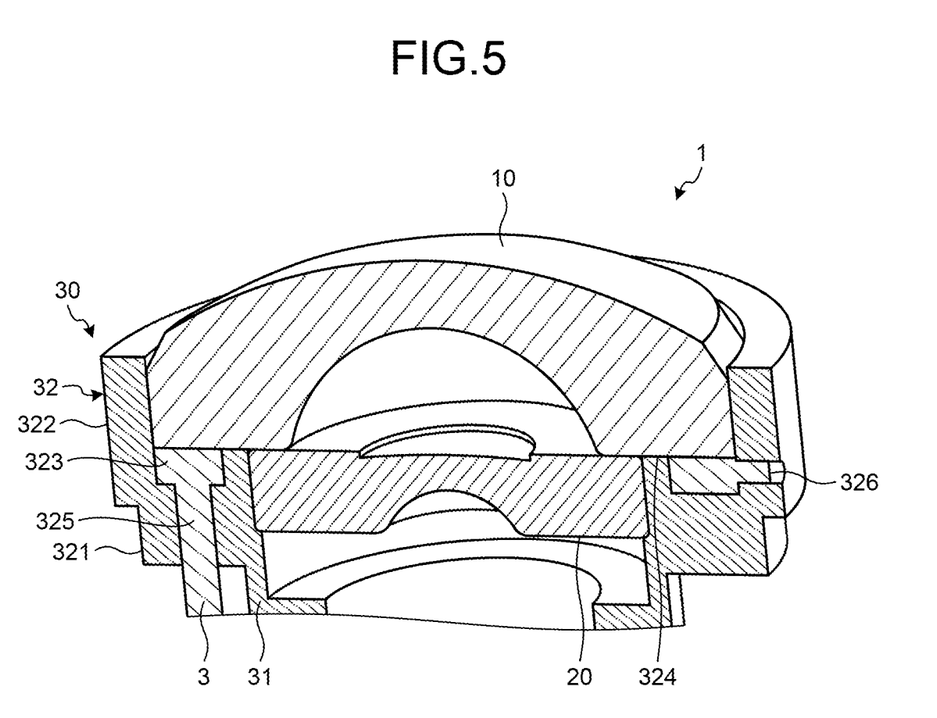
FIG. 5 is a sectional view illustrating a state where a housing groove of the lens unit 1 according to the aspect of the first embodiment of the present disclosure is filled with the adhesive.

FIG. 4 is a diagram illustrating the method of injecting the adhesive 3 into the lens unit 1 according to the aspect of the first embodiment of the present disclosure. FIG. 5 is a sectional view illustrating a state where the housing groove 323 of the lens unit 1 according to the aspect of the first embodiment of the present disclosure is filled with the adhesive 3.

A syringe 2 is filled with the adhesive 3 for adhesively bonding of the first lens 10. As illustrated in FIG. 4, the needle of the syringe 2 is inserted into the injection hole 325, and then the syringe 2 injects the adhesive 3 into the housing groove 323. The adhesive 3 is supplied from the injection hole 325 to the vent hole 326 along the housing groove 323. At this time, the vent hole 326 discharges air in the housing groove 323 pushed out by the adhesive 3 to the outside of the housing groove 323. The housing groove 323 is thus filled with the adhesive 3. The adhesive 3 is not limited to being injected into the housing groove 323 by the syringe 2, but may be injected by other instruments or devices.

The syringe 2 may continue to inject the adhesive 3 for a predetermined period of time after the adhesive 3 is discharged from the vent hole 326. This allows the syringe 2 to discharge air from the housing groove 323 to the outside of the housing groove 323. The lens unit 1 thus can reduce a possibility of air bubbles being generated, thereby making it possible to prevent formation of cavities.

The syringe 2 may inject the adhesive 3 in a state where the lens unit 1 is tilted such that the vent hole 326 is directed upward. This allows air in the housing groove 323 to float up and thus be discharged to the outside of the housing groove 323 through the vent hole 326. The lens unit 1 thus can reduce a possibility of air bubbles being generated, thereby making it possible to prevent formation of cavities.

The vent hole 326 may be attached to a suction device that sucks air in the housing groove 323. This allows air in the housing groove 323 to be discharged to the outside of the housing groove 323. The lens unit 1 thus can reduce a possibility of air bubbles being generated, thereby making it possible to prevent formation of cavities.

As described above, the lens unit 1 according to the aspect of the first embodiment of the present disclosure includes the lens barrel 30. The lens barrel 30 includes the flange portion 32 for bonding of the first lens 10. The flange portion 32 has an annular shape substantially the same as the outer edge of the first lens 10 in size, and has the housing groove 323 the opening of which is to be closed by the first lens 10. The housing groove 323 has the vent hole 326 that discharges air from the housing groove 323 when the housing groove 323 is filled with the adhesive 3 for adhesively bonding of the first lens 10. As a result, the lens unit 1 can discharge air bubbles formed on an adhesive interface and in an adhesive layer, thereby making it possible to prevent formation of cavities on the adhesive interface and in the adhesive layer.

First Modification

The following describes a first modification of the first embodiment.

Figure 6:
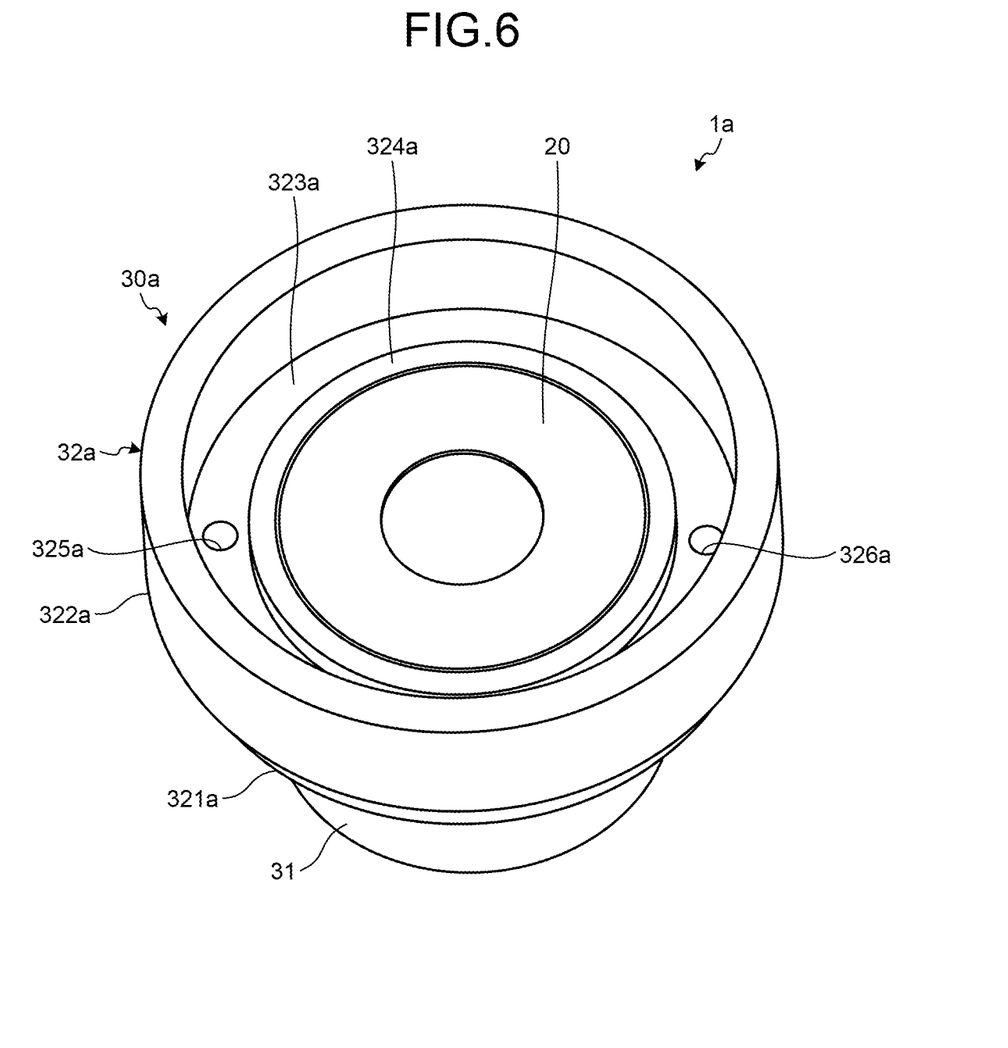
FIG. 6 is a perspective view illustrating an outer appearance of a lens unit according to an aspect of a first modification of the first embodiment of the present disclosure in a state where the first lens is removed.
Figure 7:
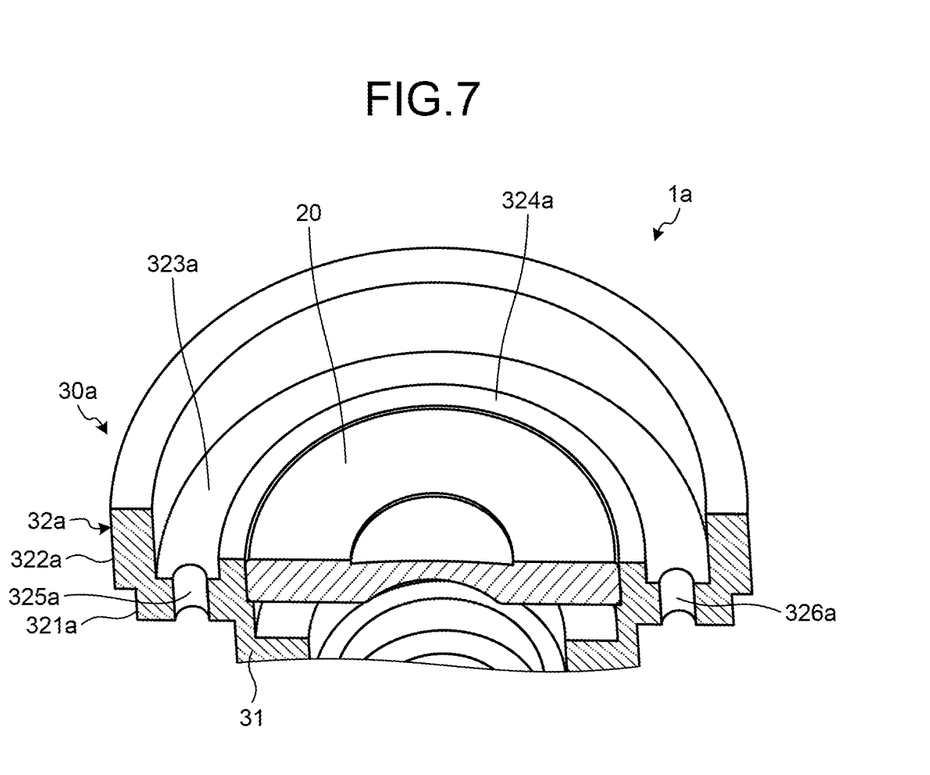
FIG. 7 is a sectional view illustrating a section of the lens unit according to the aspect of the first modification of the first embodiment of the present disclosure.

FIG. 6 is a perspective view illustrating an outer appearance of a lens unit 1a according to an aspect of the first modification of the first embodiment of the present disclosure in a state where the first lens 10 is removed. FIG. 7 is a sectional view of a section of the lens unit 1a according to the aspect of the first modification of the first embodiment of the present disclosure.

The lens unit 1 according to the aspect of the first embodiment of the present disclosure has the vent hole 326 in the wall portion 322 of the flange portion 32. In the lens unit 1a according to the aspect of the first modification, a vent hole 326a is not provided in a wall portion 322a but is provided in a bottom portion 321a of a flange portion 32a of a lens barrel 30a.

As illustrated in FIGS. 6 and 7, the vent hole 326a is formed at the bottom surface of a housing groove 323a. The opening of the housing groove 323a is closed by the first lens 10 when the first lens 10 is abutted on an abutting portion 324a of the flange portion 32a. More specifically, the vent hole 326a is provided in the bottom portion 321a of the flange portion 32a. The vent hole 326a is formed substantially parallel to the optical axis direction of the lens unit 1. In other words, the vent hole 326a is the hole that passes from the outside of the flange portion 32a to the housing groove 323a through the bottom portion 321a of the flange portion 32a. The vent hole 326a discharges air from the housing groove 323 when the needle of syringe 2 is inserted into an injection hole 325a.

In this case also, the syringe 2 may inject the adhesive 3 in a state where the lens unit 1a is tilted such that the vent hole 326a is directed upward. This allows air in the housing groove 323a to float up and thus be discharged to the outside of the housing groove 323a through the vent hole 326a. The lens unit 1a thus can reduce a possibility of air bubbles being generated, thereby making it possible to prevent formation of cavities.

As described above, in the lens unit 1a according to the aspect of the first modification of the first embodiment of the present disclosure, the vent hole 326a is provided in the bottom portion 321a of the flange portion 32a. In this case also, the vent hole 326a discharges air from the housing groove 323a in the same manner as the first embodiment. As a result, the lens unit 1a can discharge air bubbles formed on the adhesive interface and in the adhesive layer, thereby making it possible to prevent formation of cavities on the adhesive interface and in the adhesive layer.

Second Embodiment

The following describes a second embodiment.

Figure 8:
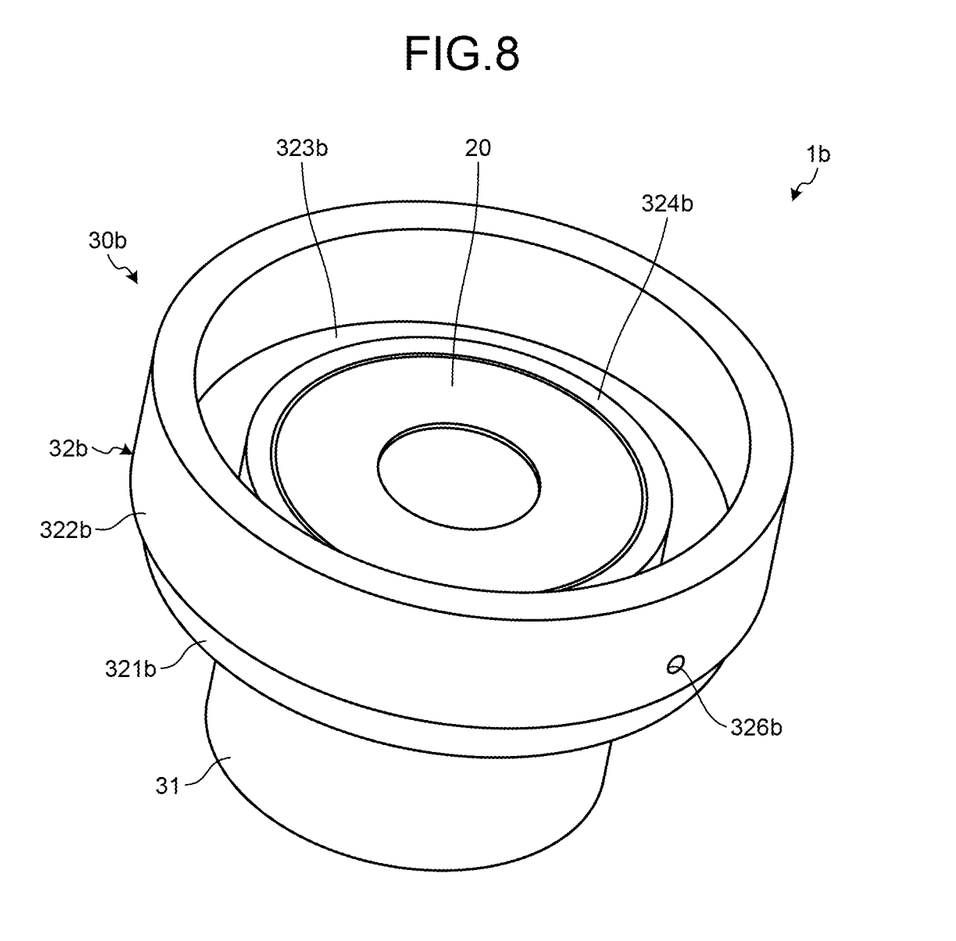
FIG. 8 is a perspective view illustrating an outer appearance of a lens unit according to an aspect of a second embodiment of the present disclosure in a state where the first lens is removed.
Figure 9:
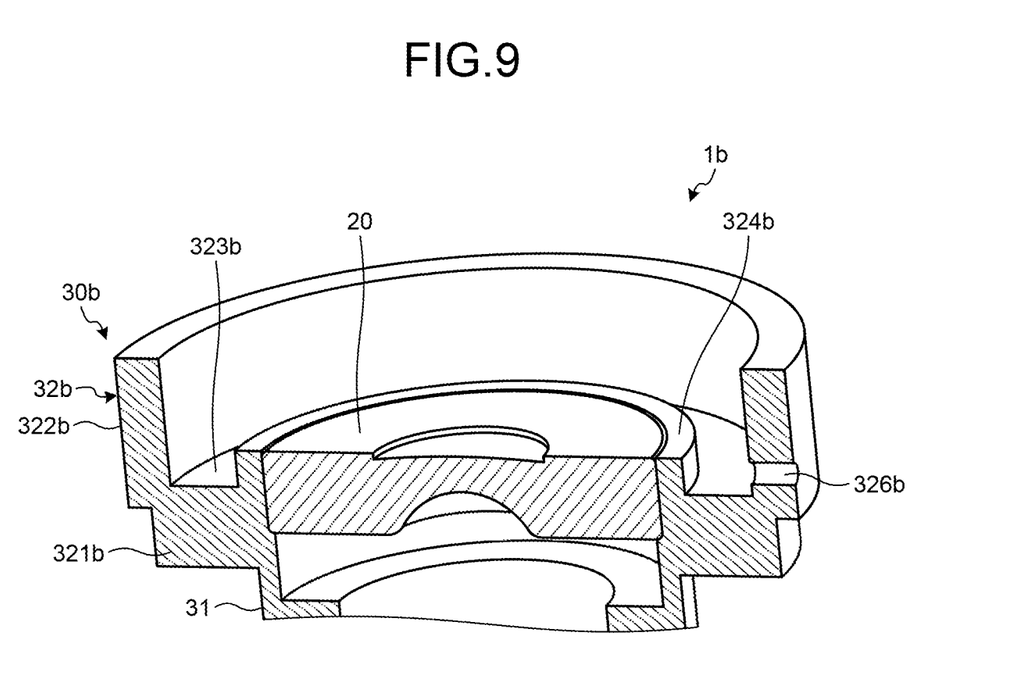
FIG. 9 is a sectional view illustrating a section of the lens unit according to the aspect of the second embodiment of the present disclosure.

FIG. 8 is a perspective view illustrating an outer appearance of a lens unit 1b according to an aspect of the second embodiment of the present disclosure in a state where the first lens 10 is removed. FIG. 9 is a sectional view illustrating a section of the lens unit 1b according to the aspect of the second embodiment of the present disclosure.

The lens unit 1 according to the aspect of the first embodiment of the present disclosure has the injection hole 325 in the bottom portion 321 of the flange portion 32. On the other hand, a flange portion 32b provided to a lens barrel 30b of the lens unit 1b according to the aspect of the second embodiment of the present disclosure does not have the injection hole 325 for injecting the adhesive 3. The syringe 2 applies the adhesive 3 to a housing groove 323b from above the flange portion 32b in a state where the first lens 10 is removed.

The following describes a method of injecting the adhesive 3 into the housing groove 323b.

Figure 10:
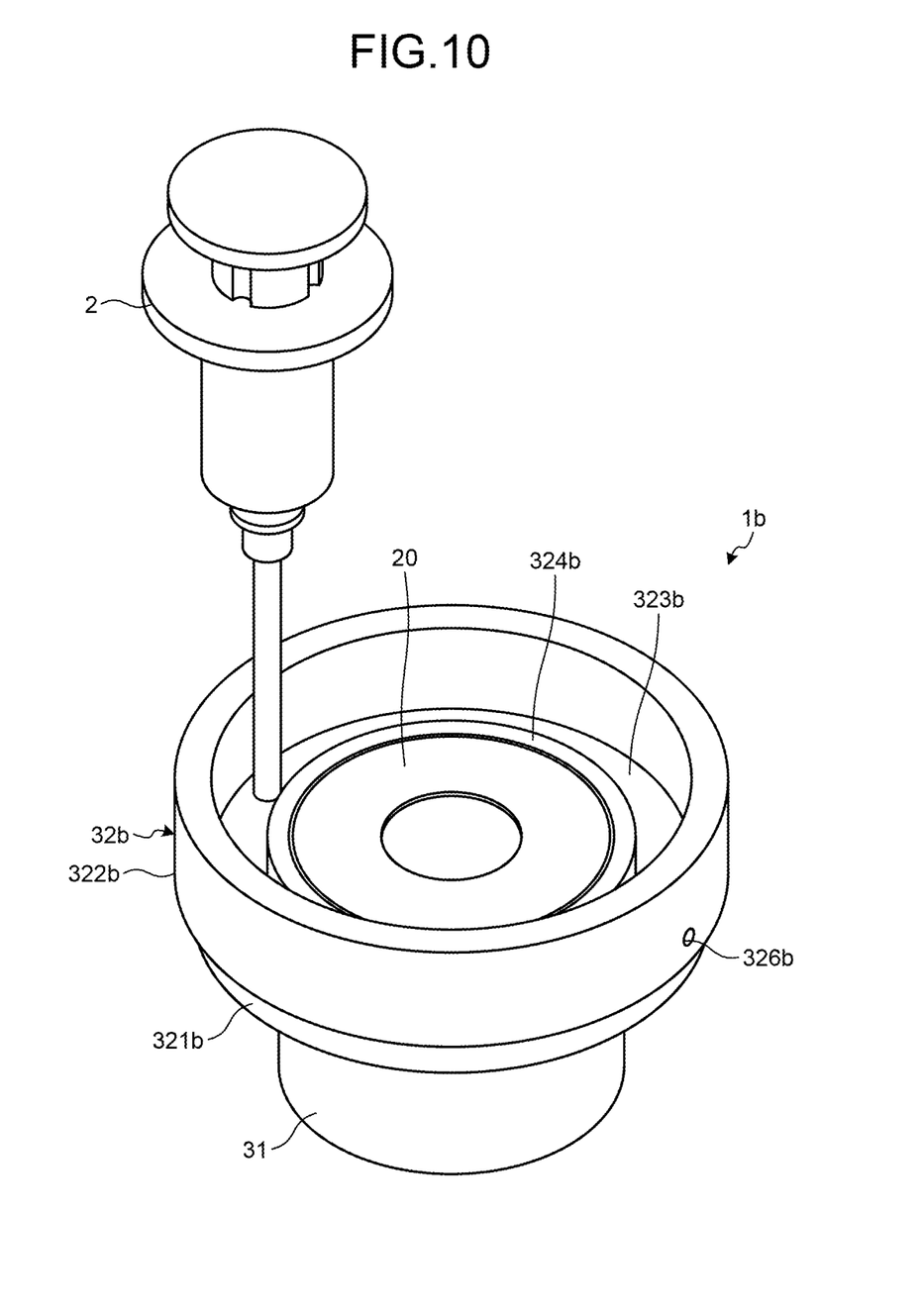
FIG. 10 is a diagram illustrating a method of injecting the adhesive into the lens unit according to the aspect of the second embodiment of the present disclosure.
Figure 11:
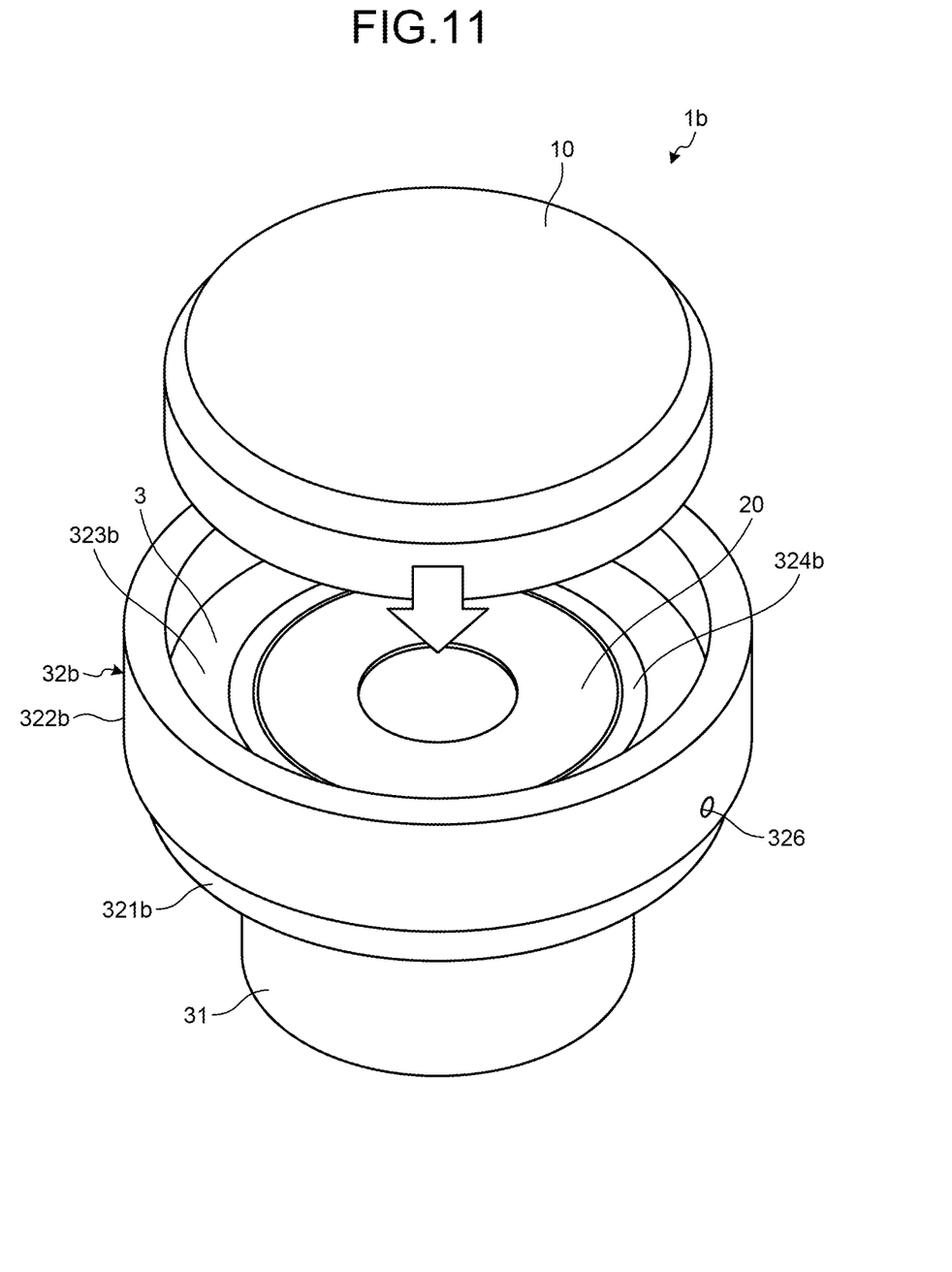
FIG. 11 is a perspective view illustrating a state where the housing groove of the lens unit according to the aspect of the second embodiment of the present disclosure is filled with the adhesive.

FIG. 10 is a diagram illustrating the method of injecting the adhesive 3 into the lens unit 1b according to the aspect of the second embodiment of the present disclosure. FIG. 11 is a perspective view illustrating a state where the housing groove 323b of the lens unit 1b according to the aspect of the second embodiment of the present disclosure is filled with the adhesive 3.

As illustrated in FIG. 10, the syringe 2 applies the adhesive 3 to the housing groove 323b from above the flange portion 32b in a state where the first lens 10 is removed. At this time, the manufacturing worker may close a vent hole 326b depending on the viscosity of the adhesive 3. In a case where the adhesive 3 applied in the housing groove 323b flows out from the vent hole 326b, the manufacturing worker closes the vent hole 326b. On the other hand, in a case where the adhesive 3 does not flow out from the vent hole 326b, the manufacturing worker need not close the vent hole 326b.

The syringe 2 applies the adhesive 3 with a volume more than that of the housing groove 323b by using the surface tension of the adhesive 3 and other factors. After applying the adhesive 3 to the housing groove 323b, the manufacturing worker fits the first lens 10 into the flange portion 32b as illustrated in FIG. 11. When the vent hole 326b is closed, the manufacturing worker fits the first lens 10 into the flange portion 32b under a state where the vent hole 326b is open.

The first lens 10 is fitted by being abutted on an abutting portion 324b of the flange portion 32b, resulting in the opening of the housing groove 323b being closed. Because the opening of the housing groove 323b is closed, air in the housing groove 323b is discharged from the vent hole 326b together with the adhesive 3. Air in the housing groove 323b is discharged in this manner. The lens unit 1b thus can reduce a possibility of air bubbles being generated, thereby making it possible to prevent formation of cavities.

The lens unit 1b may be tilted such that the vent hole 326b is directed upward after the first lens 10 is fitted. This allows air in the housing groove 323b to float up and thus be discharged to the outside of the housing groove 323b through the vent hole 326b. The lens unit 1b thus can reduce a possibility of air bubbles being generated, thereby making it possible to prevent formation of cavities.

The lens unit 1b illustrated in FIGS. 8 and 9 has the single vent hole 326b having a circular cross-sectional shape. The number of vent holes 326b, the cross-sectional shape and the size of the vent hole 326b may be changed as appropriate. The vent hole 326b is not limited to being provided in a wall portion 322b, but may be provided in a bottom portion 321b as described in the first modification, or at other location.

As described above, in the lens unit 1b according to the aspect of the second embodiment of the present disclosure, the vent hole 326b discharges air from the housing groove 323b when the first lens 10 is fitted in the same manner as the first embodiment. As a result, the lens unit 1b can discharge air bubbles formed on the adhesive interface and in the adhesive layer, thereby making it possible to prevent formation of cavities on the adhesive interface and in the adhesive layer.

The lens unit 1b in the second embodiment may have the vent hole 326b provided in the bottom portion 321b of the flange portion 32b in the same manner as the first modification of the first embodiment.

As described in the first embodiment, the first modification of the first embodiment, and the second embodiment, the flange portion 32b has a wider width than that of the body portion 31. In other words, it is explained that the outer diameter of the flange portion 32b is larger than that of the body portion 31. This allows, as illustrated in FIG. 4, the syringe 2 to inject the adhesive 3 from the position on the side of the body portion 31 and below the flange portion 32b. However, when the needle of the syringe 2 is long, or when the needle is inserted into the injection hole 325a from the side of the flange portion 32b, the size of the outer diameter of the flange portion 32b may be the same as that of the body portion 31 or smaller than that of the body portion 31.

The contents of the present disclosure are described on the basis of the embodiments. The embodiments are examples, and it is understood by those skilled in the art that various modifications are possible in the combination of their respective constituent elements or respective processing processes, and that such modifications are also within the scope of the invention.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A lens unit comprising:
   a first lens having a first surface and a second surface opposite the first surface;
   a second lens having a third surface and a fourth surface opposite the third surface, the third surface of the second lens facing the second surface of the first lens;
   a lens barrel having a flange portion including a first cylindrical shape and a body portion including a second cylindrical shape and located inside the flange portion, the flange portion having a wider width than the body portion, the flange portion having a bottom portion and a wall portion surrounding the bottom portion, the bottom portion of the flange portion having a fifth surface and sixth surface opposite the fifth surface and located between the wall portion of the flange portion and the body portion, the bottom portion of the flange portion connecting the wall portion of the flange portion and body portion, the flange portion housing the first lens, the body portion housing the second lens, the body portion having an abutting portion contacting on the second surface of the first lens; and
   an adhesive for bonding the first lens and the lens barrel,
   wherein the lens barrel has a groove having an annular shape and located between an outer surface of the abutting portion of the body portion and an inner surface of the wall portion of the flange portion,
   wherein the adhesive is disposed at least in the groove and bonds a part of the second surface of the first lens, the outer surface of the abutting portion of the body portion, the inner surface of the wall portion of the flange portion, and the fifth surface of the bottom portion of the flange portion,
   wherein the flange portion of the lens barrel includes:
      a first hole for discharging air, the first hole being formed in the groove of the flange portion; and
      a second hole for injecting the adhesive, the second hole being formed in the groove of the flange portion;
   wherein the first hole passes from an outer surface of the wall portion to the inner surface of the wall portion along a direction perpendicular to an optical axis direction and connects the groove, and
   wherein the second hole passes from the sixth surface of the bottom portion to the fifth surface of the bottom portion along the optical axis direction and connects the groove.

2. The lens unit according to claim 1, wherein
   the groove is filled with the adhesive,
   the first hole is at least partially filled with the adhesive, and
   the second hole is at least partially filled with the adhesive.

3. The lens unit according to claim 2 wherein
   the first lens is located at the inner surface of the wall portion of the flange portion, and
   the second lens is located at an inner surface of the body portion.

4. The lens unit according to claim 3, wherein
   the second lens is fitted in an upper distal end portion of the body portion inside the flange portion.

5. The lens unit according to claim 1, wherein each of the first hole and the second hole has a circular cross-sectional shape.

6. The lens unit according to claim 2, wherein each of the first hole and the second hole has a diameter equal to or larger than 0.02 mm.

* * * * *